(12) United States Patent
Kurihara (10) Patent No.: US 12,028,326 B2
(45) Date of Patent: Jul. 2, 2024

(54) INFORMATION PROCESSING APPARATUS, METHOD FOR CONTROLLING INFORMATION PROCESSING APPARATUS, SYSTEM, AND STORAGE MEDIUM

(71) Applicant: CANON KABUSHIKI KAISHA, Tokyo (JP)

(72) Inventor: Shukei Kurihara, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 233 days.

(21) Appl. No.: 17/511,408

(22) Filed: Oct. 26, 2021

(65) Prior Publication Data

US 2022/0141205 A1    May 5, 2022

(30) Foreign Application Priority Data

Oct. 30, 2020   (JP) .................................. 2020-183169

(51) Int. Cl.
| | |
|---|---|
| *H04L 9/40* | (2022.01) |
| *G06F 9/455* | (2018.01) |
| *H04N 1/00* | (2006.01) |
| *H04N 1/44* | (2006.01) |
| *H04W 12/06* | (2021.01) |

(52) U.S. Cl.
CPC .......... *H04L 63/08* (2013.01); *G06F 9/45558* (2013.01); *H04N 1/00244* (2013.01); *H04N 1/00411* (2013.01); *H04N 1/4433* (2013.01); *H04W 12/06* (2013.01); *G06F 2009/45595* (2013.01); *H04N 1/4413* (2013.01)

(58) Field of Classification Search
CPC ................. H04L 63/08; G06F 9/45558; G06F 2009/45595; H04N 1/00244; H04N 1/00411; H04N 1/4433; H04W 12/06

USPC ............................................................ 726/7
See application file for complete search history.

(56) References Cited

U.S. PATENT DOCUMENTS

| | | | | |
|---|---|---|---|---|
| 8,407,773 | B1* | 3/2013 | Hayter | H04L 67/51 |
| | | | | 726/7 |
| 8,683,580 | B2* | 3/2014 | Shimizu | G06F 21/608 |
| | | | | 726/19 |
| 8,713,206 | B2* | 4/2014 | Kotani | G09G 3/002 |
| | | | | 710/16 |
| 9,906,674 | B2* | 2/2018 | Nishii | G06F 3/1222 |
| 10,225,435 | B2* | 3/2019 | Hosoda | H04N 1/4426 |

(Continued)

FOREIGN PATENT DOCUMENTS

| | | |
|---|---|---|
| CN | 108932423 A | 12/2018 |
| CN | 110430249 A | 11/2019 |
| JP | 2007159057 A | 6/2007 |

(Continued)

*Primary Examiner* — Badrinarayanan (74) *Attorney, Agent, or Firm* — Canon U.S.A., Inc. IP Division (57) ABSTRACT

There has been such an issue that, when an operation for stopping a Virtual Network Computing (VNC) connection is received from a user on a mobile terminal in a state where the VNC connection is established between the mobile terminal and a multifunction peripheral (MFP) and the user is logged in to the MFP, a screen in a state where the user is logged in is continued to be displayed on the MFP. One aspect of the present disclosure allows processing for logging the user out of the MFP to be automatically performed when processing for disconnecting the VNC connection is received.

8 Claims, 10 Drawing Sheets

(56) References Cited

U.S. PATENT DOCUMENTS

2016/0373594 A1* 12/2016 Kurihara .............. H04N 1/4413

FOREIGN PATENT DOCUMENTS

| JP | 2008146507 A | 6/2008 |
|----|--------------|--------|
| JP | 2013219510 A | 10/2013 |
| JP | 2016021654 A | 2/2016 |
| JP | 6451194 B2 | 1/2019 |

* cited by examiner

INFORMATION PROCESSING APPARATUS, METHOD FOR CONTROLLING INFORMATION PROCESSING APPARATUS, SYSTEM, AND STORAGE MEDIUM

BACKGROUND

Field of the Disclosure

The present disclosure relates to remote operation of an operation panel.

Description of the Related Art

There is disclosed a method that allows an operation screen on an image forming apparatus to be operated from a personal computer (PC), a mobile terminal, or the like by employing Virtual Network Computing (VNC) using the Remote Frame Buffer (RFB) protocol for the purpose of remotely operating the operation screen on the image forming apparatus. More specifically, the image forming apparatus having a VNC server function transmits screen information of the operation screen to a terminal having a VNC client function. The terminal displays a screen similar to the operation screen displayed on the operation panel of the image forming apparatus based on the received screen information. A user can, for example, log in on the operation screen provided by the image forming apparatus and cause the image forming apparatus to execute processing without operating the operation panel of the image forming apparatus by performing an operation on the screen displayed on the terminal.

Japanese Patent Application Laid-Open No. 2007-159057 discusses a method in which an image processing apparatus transitions to a power saving mode if a main body operation unit of the image processing apparatus receives no operation for a predetermined time, when the image processing apparatus is remotely operated using VNC.

When the image processing apparatus is remotely operated from the terminal using VNC as described above, the image processing apparatus maintains a user's login state even if the user disconnects the VNC connection in a state of being logged in to the image processing apparatus. For example, a case is cited where the user establishes a VNC connection with the image processing apparatus from the terminal, logs in to the image processing apparatus and performs print processing by operating the terminal, and then, disconnects the VNC connection and ends the remote operation on the terminal without performing logout processing. In this case, the image processing apparatus maintains the screen display in the state that the user is logged in, which raises an issue in terms of security.

SUMMARY

To solve the issue above, embodiments of the present disclosure are directed to providing a method for ensuring security even when a remote operation is stopped without the logout processing being performed. According to embodiments of the present disclosure, a method for controlling an information processing apparatus configured to communicate with an image processing apparatus configured to perform login processing includes displaying a screen subjected to display control in such a manner that a screen displayed on a display unit included in the information processing apparatus and a screen displayed on a display unit included in the image processing apparatus are linked to each other, and transmitting an instruction for causing a user to log out of the image processing apparatus to the image processing apparatus in a case where an event for stopping the display control is received.

Further features of the present disclosure will become apparent from the following description of exemplary embodiments with reference to the attached drawings.

DESCRIPTION OF THE EMBODIMENTS

In the following description, representative exemplary embodiments of the present disclosure will be described with reference to the drawings. However, the exemplary embodiments that will be described below are not intended to limit the present disclosure, and further, not all of combinations of features that will be described in the exemplary embodiments are necessarily essential to the solution of the disclosure.

System Configuration According to First Exemplary Embodiment

Figure 1:
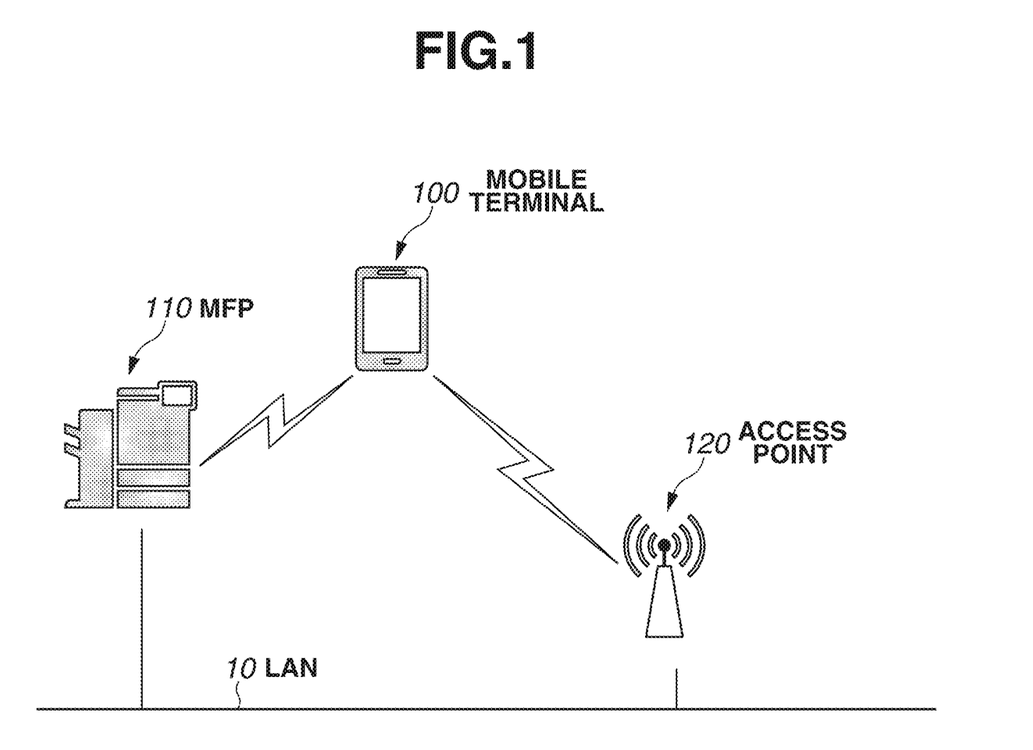
FIG. 1 illustrates a configuration of a communication system.

First, the system configuration according to a first exemplary embodiment will be described with reference to FIG. 1. The first exemplary embodiment will be described here citing a mobile terminal 100 and a multifunction peripheral (MFP) 110 as examples of an information processing apparatus, but the apparatus included in an information processing system is not limited thereto. The mobile terminal 100 and the MFP 110 are connected to a local area network (LAN) 10 and can exchange information with each other. The mobile terminal 100 is connected to the LAN 10 via an access point 120.

The mobile terminal 100 has a Virtual Network Computing (VNC) client function for remotely operating the MFP 110. More specifically, the mobile terminal 100 includes VNC client software that supports the Remote Frame Buffer (RFB) protocol. The mobile terminal 100 establishes a VNC connection with the MFP 110 and displays a screen displayed on an operation panel of the MFP 110 on the mobile terminal 100. The MFP 110 has a VNC server function and transmits screen information to the mobile terminal 100 serving as a VNC client when the mobile terminal 100 establishes the VNC connection therewith. The mobile terminal 100 renders the screen based on the transmitted screen information. The screens are linked in such a manner that the screens displayed on respective display units of the mobile terminal 100 and the MFP 110 are changed in response to an operation received on the rendered screen or an operation received on the MFP 110.

Figure 2:
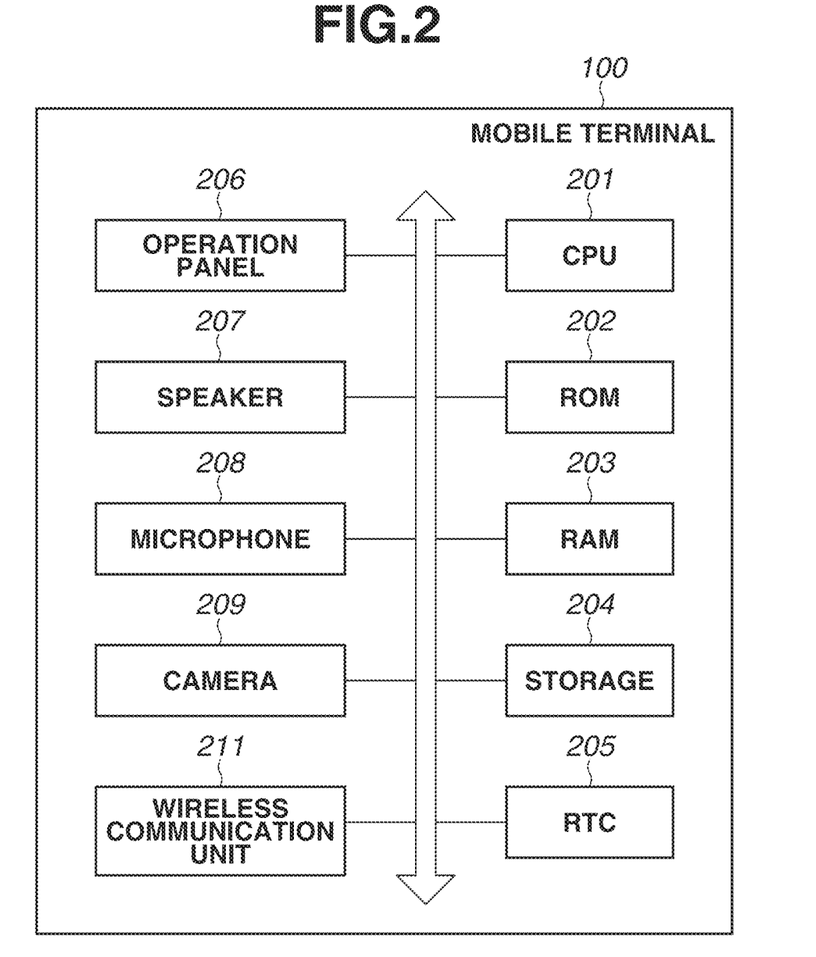
FIG. 2 illustrates a hardware configuration of a mobile terminal.

Next, a hardware configuration of the mobile terminal 100 will be described with reference to FIG. 2. The mobile terminal 100 according to the present exemplary embodiment may be an apparatus such as a smart-phone or a tablet personal computer (PC), but may be another apparatus as long as it is an information processing apparatus capable of communicating with the MFP 110.

A central processing unit (CPU) 201 reads out a control program stored in a read only memory (ROM) 202, and performs various kinds of processing for controlling operation of the mobile terminal 100. The ROM 202 stores the control program therein. A random access memory (RAM) 203 is used as a temporary storage area, such as a main memory and a work area of the CPU 201. A storage 204 is, for example, an embedded Multi Media Card (eMMC), a solid state drive (SSD), or a hard disk drive (HDD), and stores various kinds of data such as a picture and an electronic document. Further, the storage 204 also stores an operating system (OS) 350 and an MFP application 300, which will be described below. A real time clock (RTC) 205 measures time.

In the case of the mobile terminal 100, the single CPU 201 performs each processing procedure illustrated in flowcharts that will be described below, but the mobile terminal 100 may be configured in a different manner. For example, the mobile terminal 100 can be configured to include a plurality of CPUs cooperating with one another to perform each of the processing procedures illustrated in the flowcharts that will be described below.

An operation panel 206 has a touch panel function capable of detecting a touch operation of a user, and displays various kinds of screens provided by the OS 350 and the MFP application 300. The user can input a desired operation instruction to the mobile terminal 100 by performing the touch operation onto the operation panel 206.

A speaker 207 and a microphone 208 are used, for example, when the user talks on phone with a user of another mobile terminal or a land-line phone. A camera 209 captures an image according to an imaging instruction from the user. The image captured by the camera 209 is stored in a predetermined area in the storage 204. A wireless communication unit 211 carries out wireless communication via a wireless communication LAN or the like.

Figure 3:
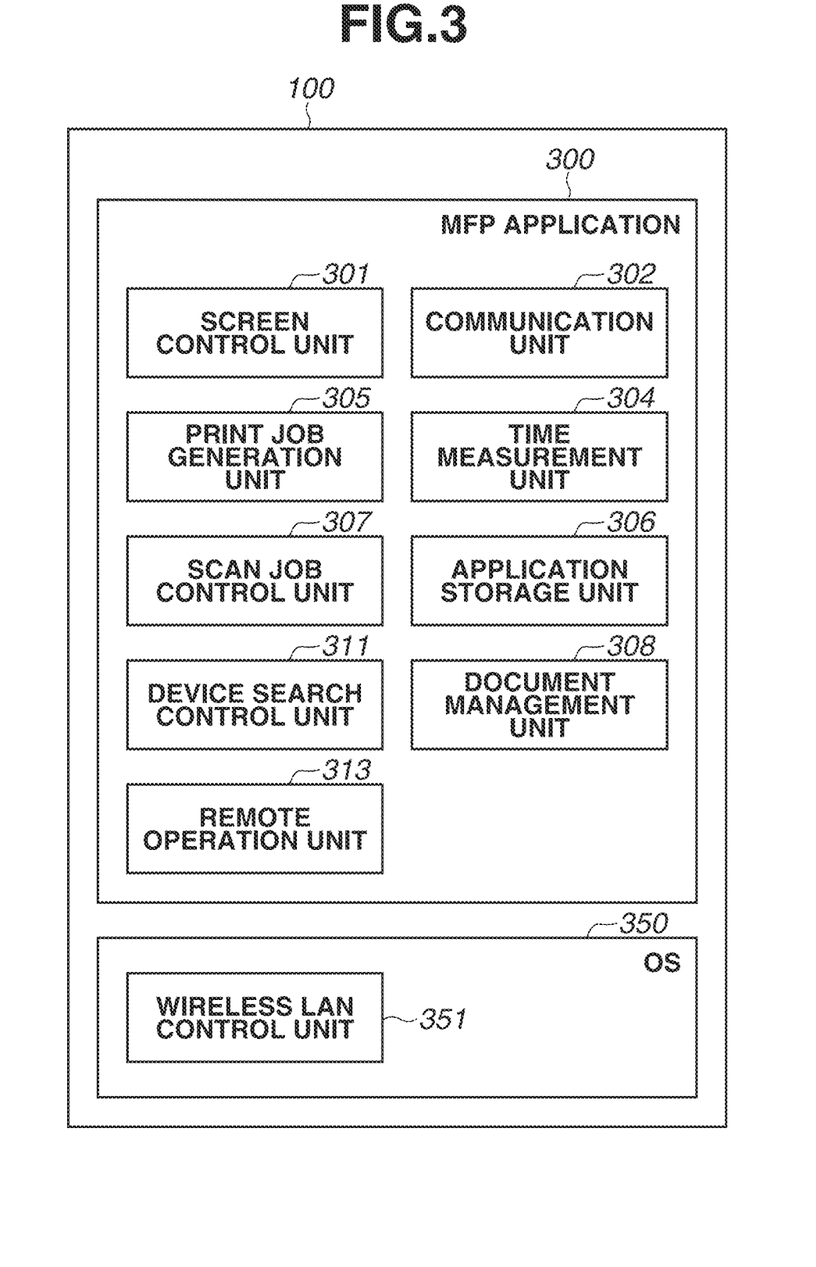
FIG. 3 illustrates a software configuration of the mobile terminal.

Next, a software configuration of the mobile terminal 100 will be described with reference to FIG. 3. FIG. 3 is a functional block diagram of the software implemented by the CPU 201 reading out the control program stored in the ROM 202 or the storage 204.

The OS 350 is software for controlling the operation of the entire mobile terminal 100. Various applications including the MFP application 300, which will be described below, can be installed in the mobile terminal 100. The OS 350 exchanges information with these applications, and changes the screen displayed on the operation panel 206 according to an instruction received from the applications. Further, the OS 350 includes a group of device drivers for controlling various kinds of hardware, and provides an application programming interface (API) for using the various kinds of hardware to an application running on the OS 350. In the present exemplary embodiment, for example, a wireless LAN control unit 351 falls into the category of the group of device drivers. The wireless LAN control unit 351 is a device driver for controlling the wireless communication unit 211.

The MFP application 300 is an application installed in the mobile terminal 100. A print instruction and a scan instruction can be issued to the MFP 110 from the MFP application 300. Further, the MFP application 300 also has functions of operating as the VNC client, displaying the operation screen of the MFP 110, and remotely operating the MFP 110 as described above. Various applications besides the MFP application 300 may be installed in the mobile terminal 100, but description thereof will be omitted herein.

The configuration of the MFP application 300 will be described in further detail. A screen control unit 301 controls the screen to be displayed on the operation panel 206 via the OS 350. The screen of the MFP application 300 is displayed on the operation panel 206 by the screen control unit 301. Further, the screen control unit 301 receives an operation instruction input by the user via the operation panel 206. A communication unit 302 controls the wireless communication carried out by the wireless communication unit 211 via the OS 350 to, for example, transmit and receive information to and from an external apparatus such as the MFP 110.

A device search control unit 311 generates search data for searching for an external apparatus to which the mobile terminal 100 will connect, and the search data is transmitted to an apparatus or apparatuses in the LAN 10 by the wireless communication unit 211. Then, a response is received from an external apparatus that responds to the search. The search data is broadcasted to all external apparatuses in the LAN 10 in some cases, or is transmitted to a single external apparatus by specifying an address in other cases.

A print job generation unit 305 generates a print job. The print job generated by the print job generation unit 305 is transmitted to the MFP 110 by the wireless communication unit 211, and the MFP 110 carries out printing based on the received print job.

A scan job control unit 307 transmits a scan instruction to the MFP 110 via the wireless communication unit 211, and the MFP 110 carries out scanning based on the instruction and transmits data generated from the scanning (scan data) to the mobile terminal 100. The mobile terminal 100 displays the received scan data. The scan data is stored in an application storage unit 306. The stored scan data is managed by a document management unit 308.

A remote operation unit 313 displays a screen based on the screen information acquired from the MFP 110 with which the VNC connection is established, and receives an operation on the displayed screen. In other words, the remote operation unit 313 operates as the VNC client. More specifically, the remote operation unit 313 displays the screen based on the screen information received from the VNC server, and transmits operation information including the position of the operation and the type of operation received on the displayed screen to the MFP 110. The MFP 110 changes the screen displayed on the MFP 110 and the screen displayed on the mobile terminal 100 based on the received operation information. The application storage unit 306 temporarily stores various kinds of information generated by the MFP application 300. A time measurement unit 304 measures time.

Figure 4:
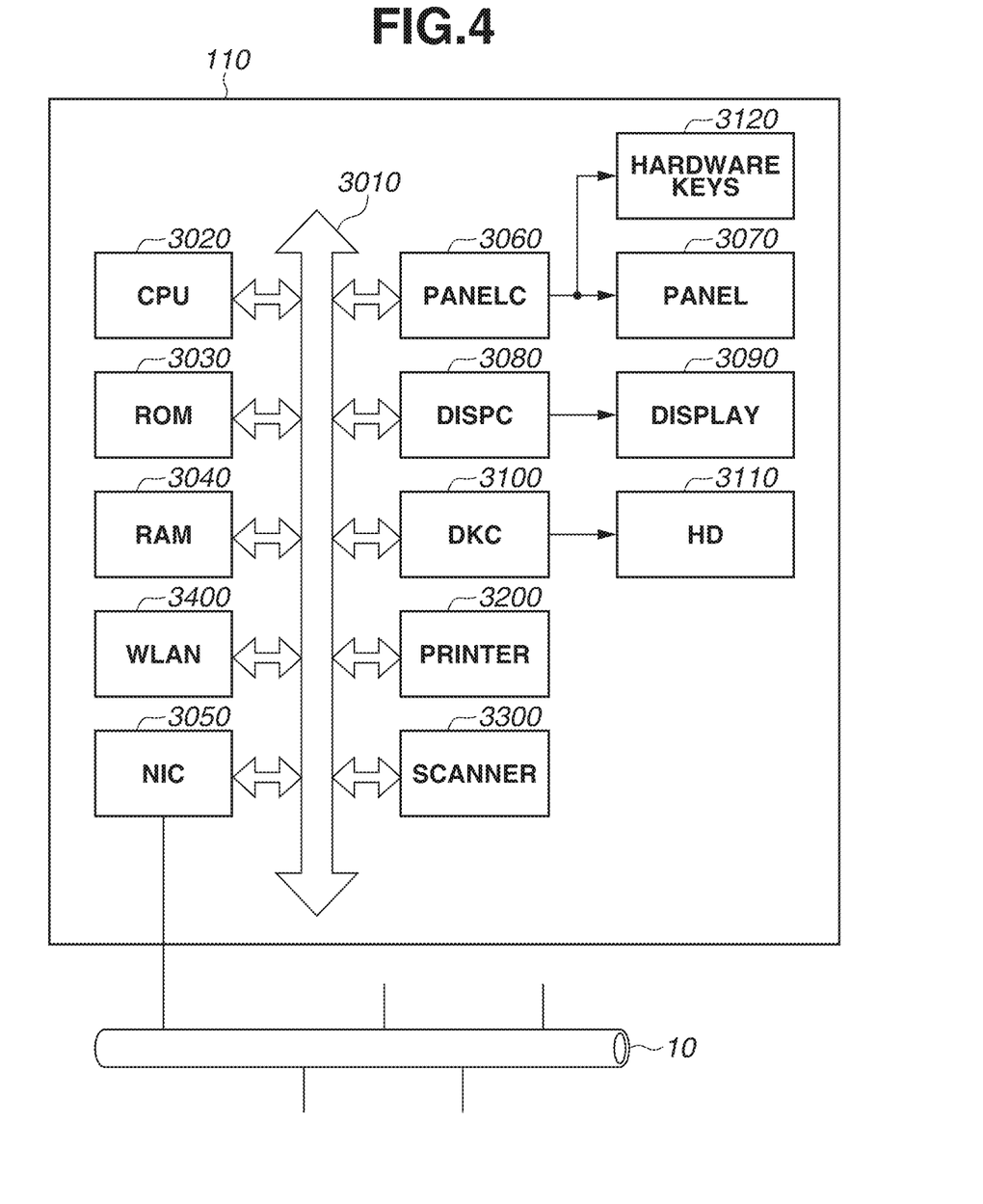
FIG. 4 illustrates a hardware configuration of a multifunction peripheral (MFP).

FIG. 4 illustrates an example of a hardware configuration of the MFP 110. The MFP 110 includes a CPU 3020, which executes a program stored in a ROM 3030 or a mass storage device 3110 such as a hard disk, and the CPU 3020 comprehensively controls each device connected to a system bus 3010.

A RAM 3040 functions as a main memory, a work area, and/or the like of the CPU 3020. An external input controller (PANELC) 3060 controls an instruction input from, for example, various kinds of hardware keys 3120 or a touch panel (PANEL) 3070 provided on the MFP 110. A display controller (DISPC) 3080 controls display on a display module (display) 3090 formed of, for example, a liquid crystal display. A disk controller (DKC) 3100 controls the mass storage device (HD) 3110.

An operation unit 900 of the MFP 110 will be described with reference to FIG. 9. A screen is displayed on the display 3090, and the hardware keys 3120 are arranged next to the display 3090. A user operation can be received on both the touch panel 3070 on the display 3090 and the hardware keys 3120. A logout key 901, which is included in the hardware keys 3120, is a button used by the user to instruct the MFP 110 to perform logout processing, by the user pressing the button in the state of being logged in to the MFP 110.

A network interface card (NIC) 3050 bidirectionally exchanges data with an external apparatus (for example, the mobile terminal 100) or a file server via the network 10. A wireless communication module (WLAN) 3400 allows the MFP 110 to operate as an access point and directly establish a wireless communication connection with the mobile terminal 100 by connecting to an access point or operating in an access point mode. A printer 3200 is a printing unit for printing onto paper that is implemented by the electrophotographic method. The printing method does not have to be the electrophotographic method in particular. A scanner 3300 is an image reading unit for reading an image printed on paper. In many cases, the scanner 3300 is equipped with an automatic document feeder (ADF) (not illustrated) as an option and can automatically read a plurality of documents. The mass storage device 3110 may also be used as an area temporarily storing an image depending on circumstances.

Figure 5:
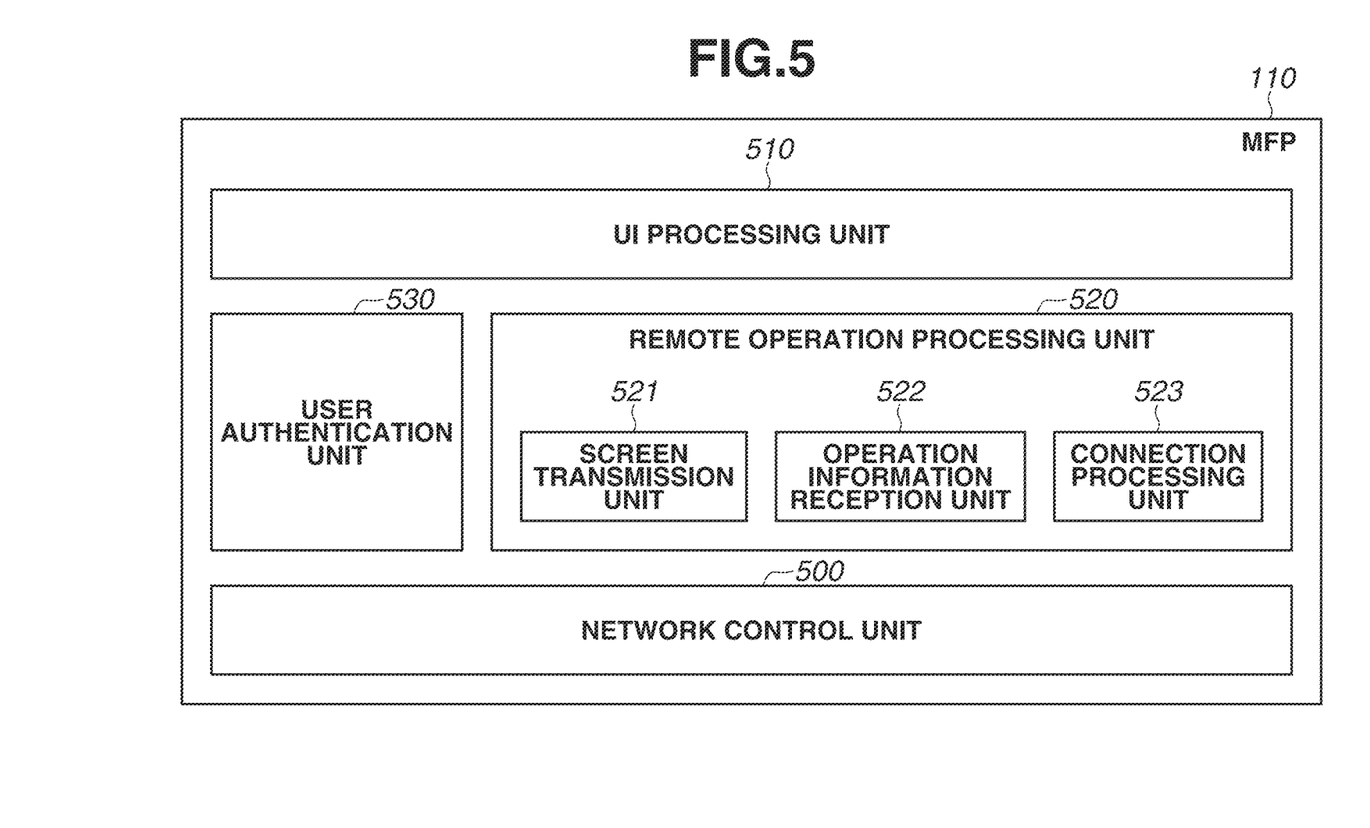
FIG. 5 illustrates a software configuration of the MFP.

FIG. 5 is a block diagram illustrating a software configuration of the MFP 110. This software is stored in, for example, the ROM 3030, and is executed by the CPU 3020.

A user interface (UI) processing unit 510 analyzes the input from the external input controller 3060 or the operation information received from an operation information reception unit 522, which will be described below, and generates screen data and displays it on the display 3090 if the screen is to be changed.

Figure 9:
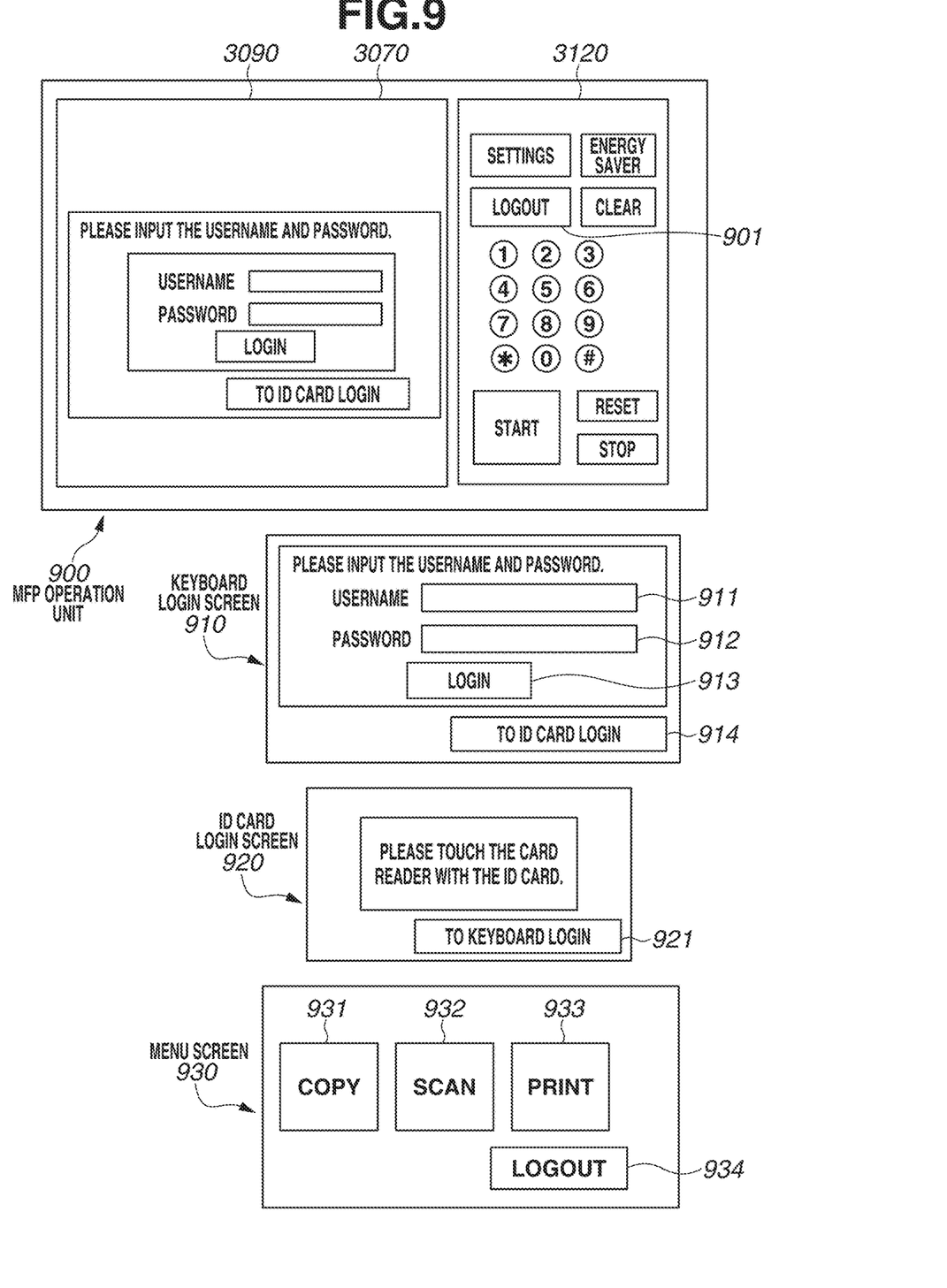
FIG. 9 illustrates UIs displayed on an operation panel of the MFP according to the exemplary embodiment.

Various kinds of screens are displayed on the display 3090 as illustrated in FIG. 9. Examples of the displayed screens include an identification (ID) card login screen 920, a keyboard login screen 910, as well as a menu screen 930 displayed while the user is logged in, an error screen (not illustrated) displayed when an error has occurred, and a counter screen (not illustrated) that displays counter information). While the MFP 110 is sleeping, the display 3090 is kept in a non-display state.

The ID card login screen 920 is a screen for logging in to the MFP 110 with an ID card with which user information is associated, and the user information is read and login processing is performed by the user holding the ID card over an ID card reader of the MFP 110 while the screen is displayed. When a keyboard login screen switching button 921 is pressed, the display is switched to the keyboard login screen 910.

The keyboard login screen 910 is a screen for logging in to the MFP 110 by the user inputting the user information using a keyboard. The login processing is performed by the user inputting the user information in a username input field 911 and a password input field 912 using the hardware keys 3120 or a software keyboard (not illustrated) and pressing a login button 913. When an ID card login switching button 914 is pressed, the display is switched to the ID card login screen 920.

The menu screen 930 is a menu screen displayed after the user logs in to the MFP 110 via the keyboard login screen 910 or the ID card login screen 920. The user can use various kinds of function of the MFP 110 by pressing a copy button 931, a scan button 932, or a print button 933 depending on an intended use. When the user presses a logout button 934, the logout processing is performed.

A remote operation processing unit 520 includes modules such as a connection processing unit 523, the operation information reception unit 522, and a screen transmission unit 521. The remote operation processing unit 520 is a VNC server module that carries out communication using the RFB protocol and is a software module that communicates with the mobile terminal 100 operating as the VNC client via the network 10. The connection processing unit 523 performs connection processing when receiving a connection request from the MFP 110 or the mobile terminal 100 serving as the VNC client, and performs disconnection processing when receiving a request to disconnect a connection.

The operation information reception unit 522 receives the operation information on the screen from the mobile terminal 100 or the MFP 110, and notifies the UI processing unit 510 of the information. The screen transmission unit 521 is a display control unit that controls the display on the screen by, for example, reading the screen data generated by the UI processing unit 510 from the RAM 3040 and transmitting the read screen data to the mobile terminal 100 serving as the VNC client.

A login processing unit 530 is a module that performs the processing for logging in to the MFP 110, and authenticates the user based on the user information received from the UI processing unit 510 and allows the user to log in if the user is successfully authenticated. The login processing unit 530 also performs the logout processing when receiving a logout instruction from the UI processing unit 510. A network control unit 500 is a module for controlling the NIC 3050. Besides them, a printer module that controls the printer 3200 and a scanner module that controls the scanner 3300 are also provided although they are not illustrated.

Figure 8A:
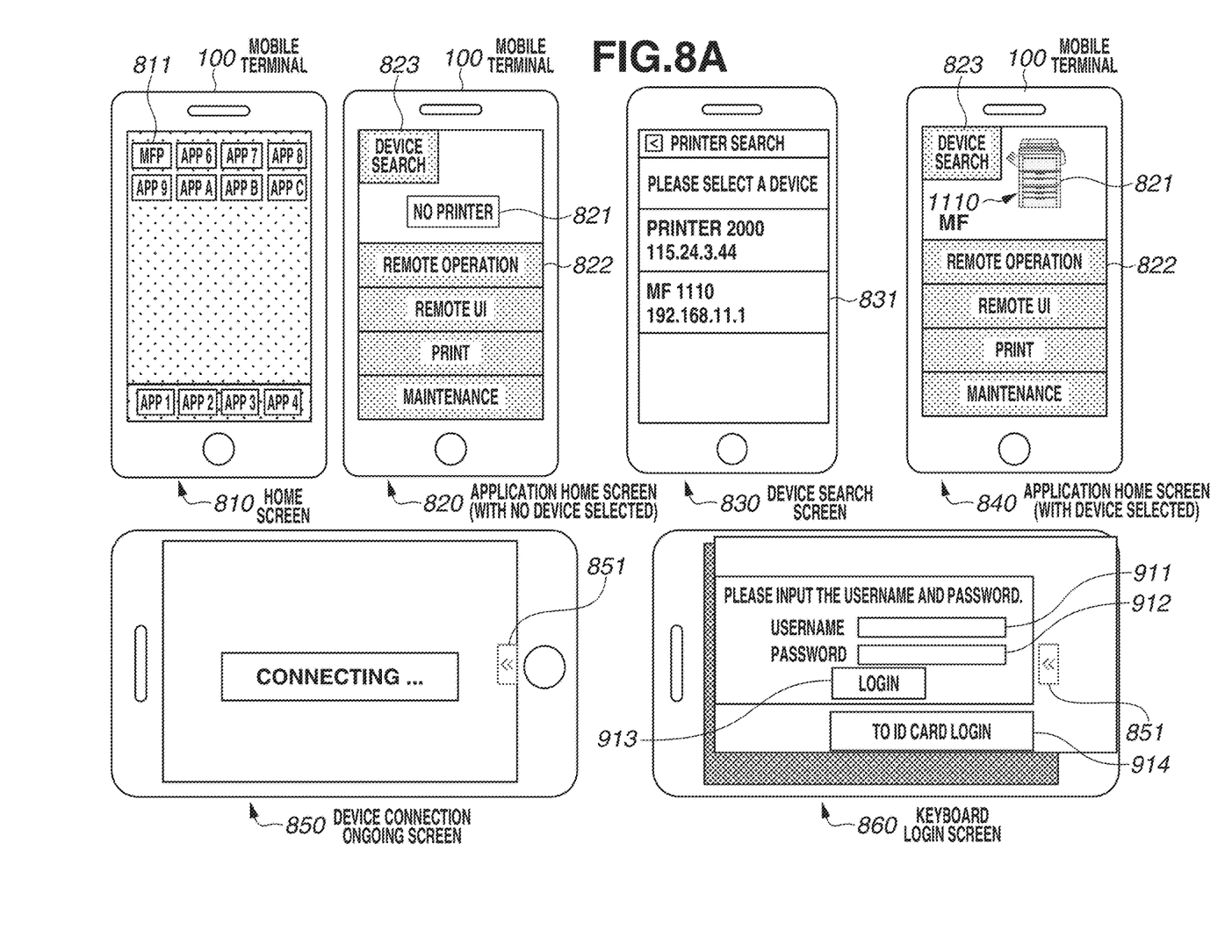
FIGS. 8A and 8B illustrate user interfaces (UIs) displayed on an operation panel of the mobile terminal according to the exemplary embodiment.
Figure 8B:
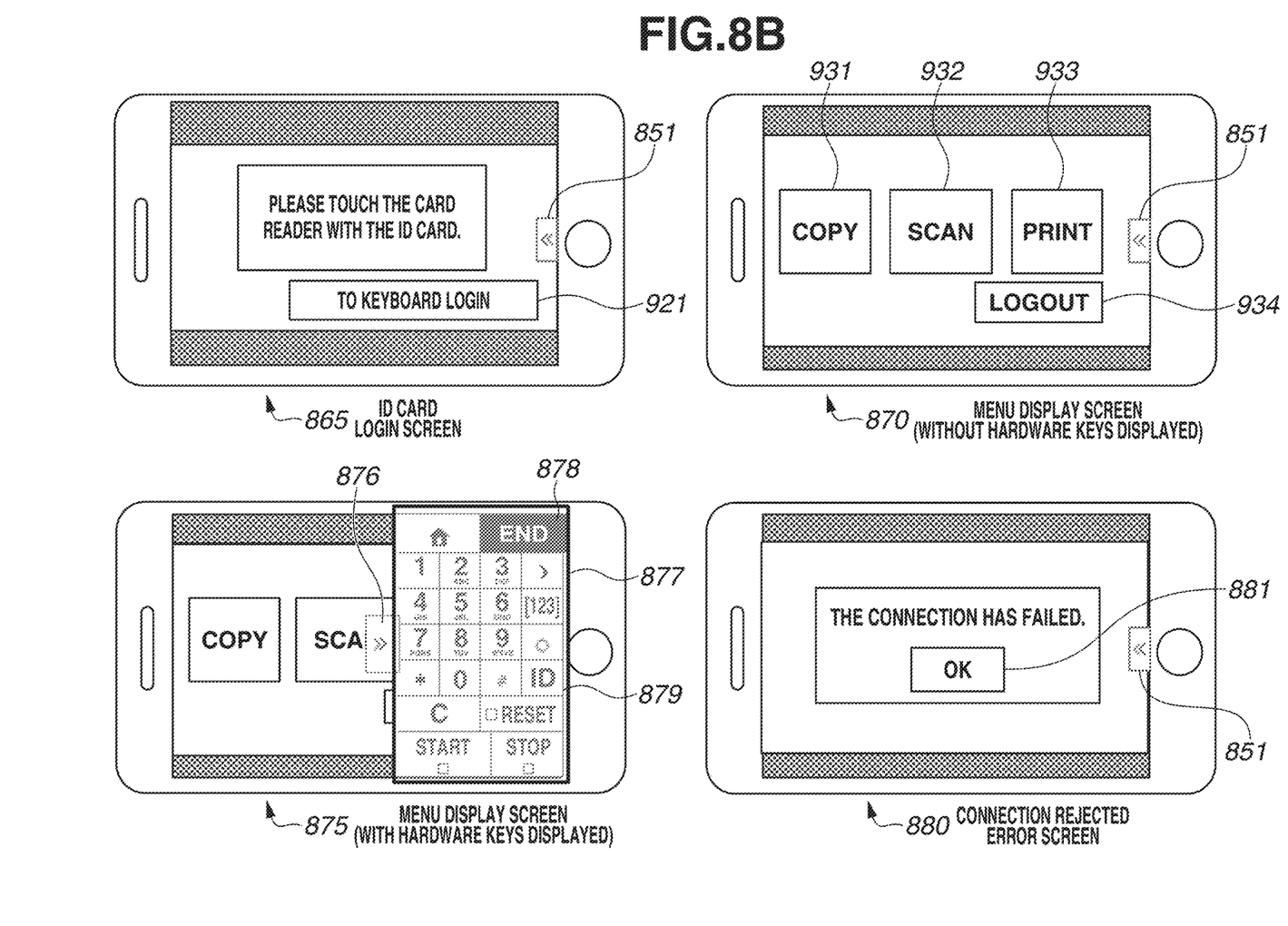

FIGS. 8A and 8B illustrate examples of screens displayed on the operation panel 206 of the mobile terminal 100. When the mobile terminal 100 is started up, a home screen 810 is displayed. An MFP application icon 811 is an icon for starting up the MFP application 300, and the MFP application 300 is started up when the MFP application icon 811 is operated.

When the MFP application 300 is started up, an application home screen (with no device selected) 820 is displayed. A selected device icon 821 displays information about an MFP with which the MFP application 300 is currently in communication or an MFP set as a target to which a job is transmitted (hereinafter referred to as a target MFP). When the target MFP is not set, the selected device icon 821 displays "NO PRINTER". A device search button 823 is a button for searching for the target MFP. A remote operation button 822 is a button for establishing a VNC connection with the target MFP and remotely operating the target MFP. Besides them, a print button for transmitting a print job to the target MFP and a button for issuing a scan instruction may also be displayed on the home screen 810.

When the device search button 823 is pressed, MFPs existing in the network 10 are searched for, and a device search screen 830 displays search results. A list of MFPs that have responded to the search is displayed on the device search screen 830. The target MFP is selected by selecting one of the search results, for example, a search result 831.

When the target MFP is selected, an application home screen (with a device selected) 840 is displayed. The selected device icon 821 displays information regarding the MFP selected on the device search screen 830. If the user taps the remote operation button 822 in a state where the target MFP is selected, a function of remotely operating the target MFP is started. The present example will be described below using a case where the target MFP is the MFP 110.

When the remote operation function is started, a device connection ongoing screen 850 is displayed. A hardware key display button 851 causes a UI for operating the hardware keys 3120 of the MFP 110 to be displayed when being pressed. Details thereof will be described below.

When the VNC connection is established and the remote operation function is established, the screen displayed on the display 3090 of the MFP 110 is displayed on the operation panel 206. A screen similar to the keyboard login screen 910, i.e., a keyboard login screen 860 is displayed at this time. The screen content is the same as content in the keyboard login screen 910 of the MFP 110 except for display of the hardware key display button 851 on the operation panel 206, and thus the description thereof will be omitted here. Alternatively, if the ID card login screen 920 is displayed on the MFP 110, an ID card login screen 865 is displayed.

When the user logs in on the keyboard login screen 860 or the ID card login screen 865, a menu screen (without the hardware keys displayed) 870 similar to the menu screen 930 is displayed (similarly, the menu screen 930 is also displayed on the display 3090).

When the hardware key display button 851 is tapped, a menu display screen (with the hardware keys displayed) 875 is displayed. More specifically, a software keyboard is displayed that includes keys to which the processing of keys in the hardware keys 3120 of the MFP 110 is assigned. A hardware key UI 877 is a UI for operating the hardware keys 3120 of the MFP 110, and, when a key displayed on the hardware key UI 877 is tapped, information about the tapped key is transmitted to the MFP 110, and the MFP 110 performs processing based on the pressed key. When a logout key 879 corresponding to the logout key 901 of the MFP 110 is pressed, the user is logged out of the MFP 110. When an end button 878 displayed on the hardware key UI 877 is tapped, the remote operation function is ended, i.e., the VNC connection is ended. After the VNC connection is ended, the application home screen (with a device selected) 840 is displayed on the operation panel 206. Further, after the VNC connection is ended, the screen that has been displayed before the end of the VNC connection is continuously displayed on the display 3090.

If the user disconnects the VNC connection without performing the logout processing, an issue arises in terms of security. For example, a case is cited where the user starts the remote operation function and causes the MFP 110 to perform processing such as printing or scanning from on the mobile terminal 100, and then, the user forgets to press the logout key 879 and disconnects the VNC connection, i.e., presses the end button 878 without pressing the logout key 879. In this case, the screen that has been displayed before the disconnection of the VNC connection is continued to be displayed on the display 3090, which means that the operation screen in the state where the user is logged in is kept displayed on the display 3090. At this time, since the user remotely operates the MFP 110 and is not present in front of the MFP 110, the user cannot confirm the screen displayed on the display 3090. To solve such an issue, an example in which the logout processing is automatically performed when the VNC connection is disconnected, i.e., the end button 878 is pressed, without the user being logged out of the MFP 110 while performing the remote operation function is described.

Figure 6:
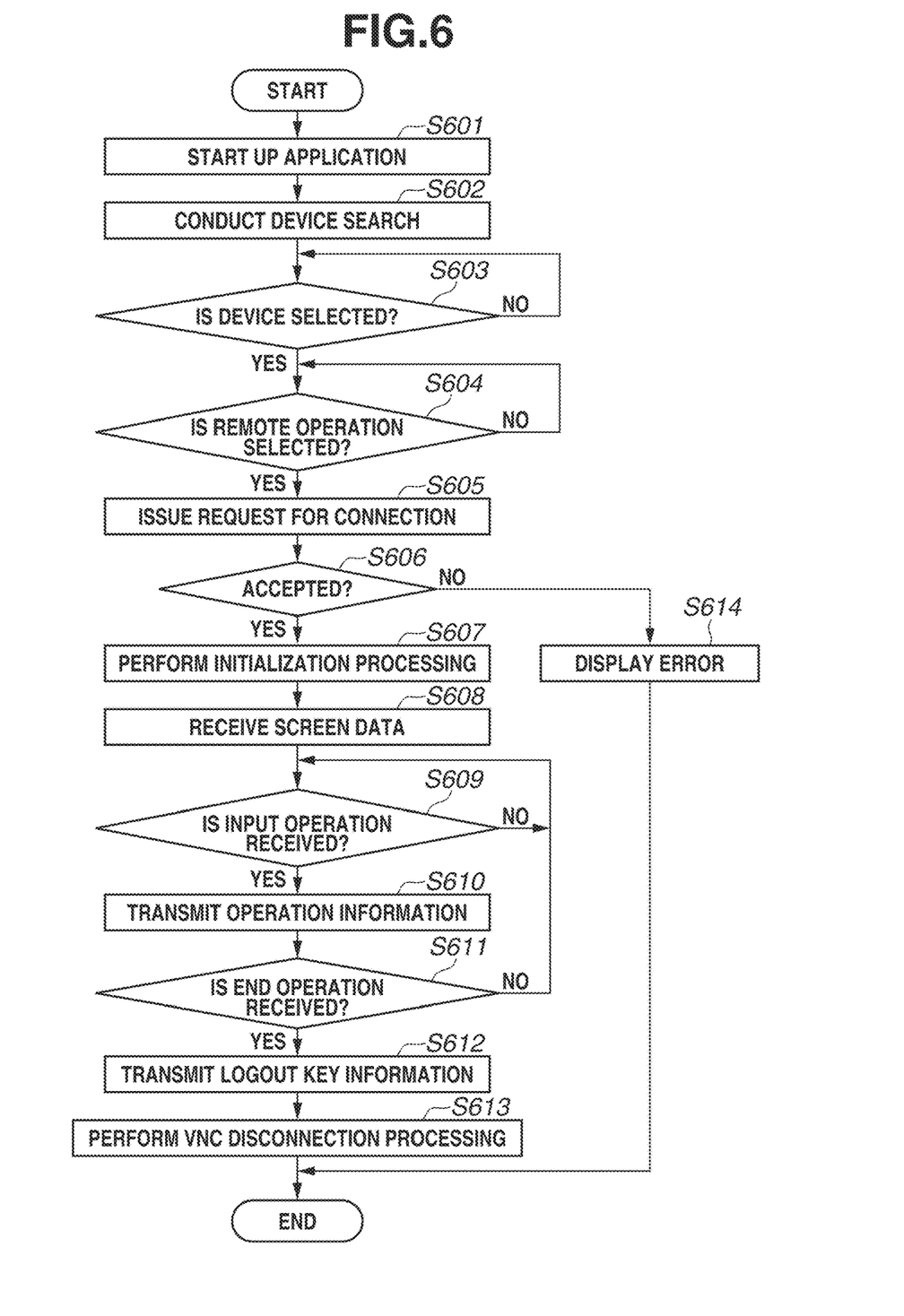
FIG. 6 is a flowchart illustrating processing on the mobile terminal side according to an exemplary embodiment.

FIG. 6 is a flowchart illustrating processing by the mobile terminal 100 from establishing the VNC connection with the MFP 110 and performing the remote operation to disconnecting the VNC communication. Each step illustrated in the flowchart of FIG. 6 is processed by the CPU 201 loading the control program stored in the memory such as the ROM 202 into the RAM 203 and executing the control program.

In step S601, when a tap on the MFP application icon 811 is detected on the home screen 810, the MFP application 300 is started up. In step S602, the screen control unit 301 detects that the device search button 823 is tapped on the application home screen (with no device selected) 820, and the MFP application 300 conducts the MFP search. In step S603, the MFP application 300 determines whether an MFP is selected on the device search screen 830, and causes the screen to transition to the application home screen (with a device selected) 840 if an MFP is selected (YES in step S603). Then, the processing proceeds to step S604. If not (NO in step S603), the processing returns to step S603.

In step S604, the MFP application 300 determines whether the remote operation button 822 is selected on the application home screen (with a device selected) 840. If the remote operation button 822 is selected (YES in step S604), the processing proceeds to step S605. If not (NO in step S604), the processing returns to step S604.

In step S605, the MFP application 300 issues a request for connection using the RFB protocol to the MFP 110 selected in step S604. Then, in step S606, the MFP application 300 determines whether the request for connection is accepted. If the request for connection is accepted (YES in step S606), the processing proceeds to step S607. If the request for connection is not accepted (NO in step S606), the processing proceeds to step S614. Whether the connection is accepted is determined based on response data to the request for connection. In step S614, the screen control unit 301 displays a connection rejected error screen 880. Then, the processing is ended.

In step S607, the MFP application 300 performs initialization processing using the RFB protocol. In the initialization processing, the remote operation unit 313 transmits VNC client information and receives VNC server information.

In step S608, the remote operation unit 313 displays the screen on the operation panel 206 based on the screen information transmitted from the MFP 110, i.e., the VNC server. For example, in a case where the screen displayed on the display 3090 is the keyboard login screen 910, the keyboard login screen 860 is displayed on the operation panel 206. Further, the remote operation unit 313 controls the screen to sequentially display the screen in step S608 each time the screen information is transmitted from the MFP 110.

In step S609, the remote operation unit 313 determines whether an input operation is received from the operation panel 206. If an input operation is received (YES in step S609), the processing proceeds to step S610. If not (NO in step S609), the processing of step S609 is repeated. In step S610, the remote operation unit 313 transmits the operation information received in step S609 to the MFP 110. The transmitted operation information includes, for example, the type of operation such as a tap and a flick, information about an operated position on the screen, and information about the key operated on the hardware key UI 877.

In step S611, the remote operation unit 313 determines whether an operation for ending the VNC connection is received. For example, the remote operation unit 313 determines whether the end button 878 is pressed. If the end operation is received (YES in step S611), the processing proceeds to step S612. If not (NO in step S611), the processing returns to step S609.

In step S612, the remote operation unit 313 transmits operation information corresponding to the logout key 879 to the MFP 110. Then, the processing proceeds to step S613. In step S613, the remote operation unit 313 performs VNC disconnection processing. Then, the processing is ended. The disconnection processing refers to, for example, transmitting a disconnection request to the MFP 110.

Due to the above-described processing, the mobile terminal 100 can transmit the logout instruction to the MFP 110 even when the user disconnects the VNC connection on the mobile terminal 100 without being logged out of the MFP 110. Further, in the above-described flowchart, the remote operation unit 313 transmits the operation information corresponding to the logout key 879 to the MFP 110 when the end button 878 is pressed regardless of whether the user is in the state of being logged in to the MFP 110. However, the remote operation unit 313 may be configured to transmit the operation information corresponding to the logout key 879 when the end button 878 is pressed only if the user is in the state of being logged in to the MFP 110. For example, the remote operation unit 313 is configured not to transmit the logout instruction in response to the VNC disconnection as described above in a case where the MFP 110 operates in an environment in which the user is not authenticated.

Further, in the above-described flowchart, the remote operation unit 313 transmits the operation information corresponding to the logout key 879 to the MFP 110 in step S612. However, in a case where, for example, the logout key 879 is not provided, operation information indicating that a position corresponding to the logout button displayed on the display 3090 of the MFP 110 (for example, the position of the logout button 934 on the menu screen (without the hardware keys displayed) 870) is pressed may be transmitted from the mobile terminal 100 to the MFP 110.

Figure 7:
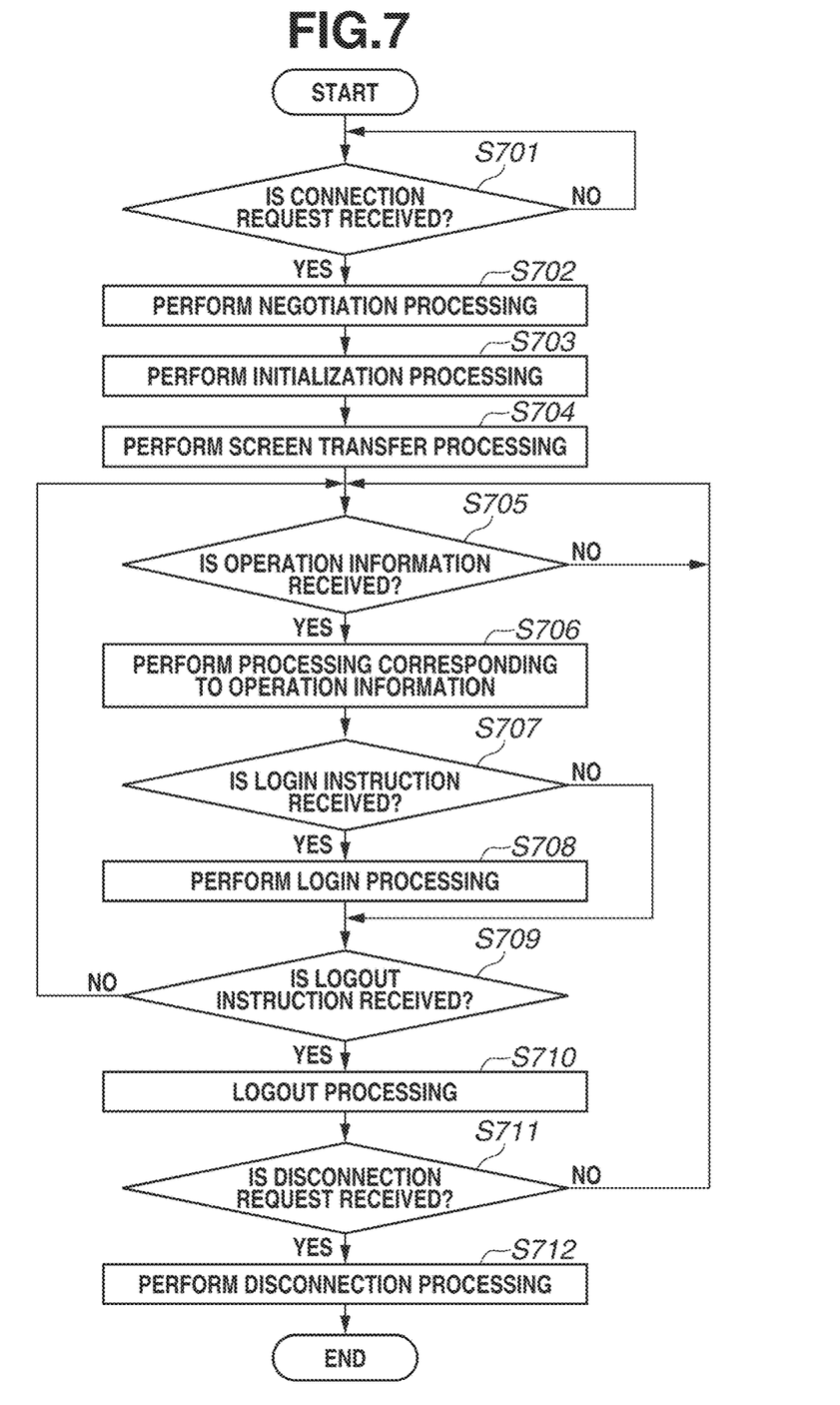
FIG. 7 is a flowchart illustrating processing on the image forming apparatus side according to the exemplary embodiment.

The processing performed by the MFP 110 will be described with reference to FIG. 7. Each step illustrated in the flowchart of FIG. 7 is processed by the CPU 3020 loading the control program stored in the memory such as the ROM 3030 into the RAM 3040 and executing the program.

In step S701, the connection processing unit 523 determines whether the VNC connection request is received from the mobile terminal 100 serving as the VNC client. If the connection request is received (YES in step S701), the processing proceeds to step S702. If the connection request is not received (NO in step S701), the processing returns to step S701. In step S702, the connection processing unit 523 performs negotiation processing and connects to the VNC client. In step S703, the connection processing unit 523 performs initialization processing and receives the client information and transmits the server information.

In step S704, the screen transmission unit 521 transmits the screen displayed on the display 3090 to the mobile terminal 100 serving as the VNC client.

In step S705, the operation information reception unit 522 determines whether the operation information is received from the mobile terminal 100. If the operation information is received (YES in step S705), the processing proceeds to step S706. If not (NO in step S705), the processing returns to step S705.

In step S706, the MFP 110 performs processing corresponding to the operation information received in step S705. Then, the processing proceeds to step S707. In a case where the screen displayed on the display 3090 is changed at this time, the changed screen information is transmitted to the mobile terminal 100, similarly to step S704. In step S707, the operation information reception unit 522 determines whether a login instruction is received. If the login instruction is received (YES in step S707), the processing proceeds to step S708. In step S708, the login processing is performed, and then the processing proceeds to step S709. In a case where the screen displayed on the display 3090 is changed at this time, the changed screen information is transmitted to the mobile terminal 100, similarly to step S704. For example, when the operation information is information indicating that the login button 913 on the keyboard login screen 860 is pressed, the operation information reception unit 522 determines that the login instruction is received. If the operation information reception unit 522 determines that the login instruction is not received in step S707 (NO in step S707), the processing proceeds to step S709.

In step S709, the operation information reception unit 522 determines whether the logout instruction is received. If the logout instruction is received (YES in step S709), the processing proceeds to step S710. If the operation information reception unit 522 determines that the logout instruction is not received in step S709 (NO in step S709), the processing returns to step S705. While an example in which the processing proceeds to step S705 is described herein, the processing may be configured to proceed to step S711 if the logout instruction is not received (NO in step S709). Whether the logout processing is received can be determined based on, for example, whether the operation information indicating that the logout key 879 is pressed is received. Further, the operation information reception unit 522 also determines that the logout processing is received when the operation information corresponding to the logout key 879 is transmitted in step S612.

In step S710, the logout processing is performed. Then, the processing proceeds to step S711. In a case where screen displayed on the display 3090 is changed at this time, the changed screen information is transmitted to the mobile terminal 100, similarly to step S704. In step S711, the connection processing unit 523 determines whether the VNC disconnection request is received. If the VNC disconnection request is received (YES in step S711), the processing proceeds to step S712. If not (NO in step S711), the processing returns to step S705. In step S712, the connection processing unit 523 performs VNC disconnection processing. Then, the processing is ended. The above-described processing has been described citing the example in which the changed screen information is transmitted from the MFP 110 to the mobile terminal 100 each time the user operation is received on the mobile terminal 100 and the screen is changed. Similarly, when a user operation is received on the MFP 110 or when the screen is changed with no user operation received, the screen information is transmitted from the MFP 110 to the mobile terminal 100 each time the screen is changed.

Due to the above-described processing, the MFP 110 can control the screens displayed on the MFP 110 and the mobile terminal 100 based on the operation received on the mobile terminal 100. Further, even when the VNC disconnection operation is performed without a logout operation being received on the mobile terminal 100, the VNC connection can be disconnected after the logout processing is performed.

In the present exemplary embodiment, when the MFP 110 is remotely operated on the mobile terminal 100, the processing for logging out of the MFP 110 can be automatically performed before the remote processing is stopped when the operation for stopping the remote processing is received on the mobile terminal 100 without the logout processing being performed. Thus, the security can be improved by automatically performing the processing for logging out of the MFP 110 when the VNC connection is disconnected in this manner. The example in which the logout processing is automatically performed when the button operation for stopping the remote processing is received on the mobile terminal 100, but the present exemplary embodiment is not limited thereto. For example, the present exemplary embodiment may be configured in such a manner that the logout processing is automatically performed also when the MFP application 300 is closed by a user operation. In this case, the MFP application 300 issues a logout instruction to the MFP 110 when closing the MFP application 300 itself.

The present exemplary embodiment has been described citing the example in which the operation information corresponding to the logout key 879 is associated with the end button 878, and the operation information corresponding to the logout key 879 is transmitted from the mobile terminal 100 to the MFP 110 when the end button 878 is pressed, but the present exemplary embodiment is not limited thereto. The present exemplary embodiment may be configured in such a manner that the mobile terminal 100 directly transmits the logout instruction to the MFP 110 when the end button 878 is pressed. Alternatively, the present exemplary embodiment may be configured in such a manner that, when the MFP 110 receives information indicating that the end button 878 is pressed from the mobile terminal 100, the MFP 110 performs the logout processing in response thereto.

Further, not only when the VNC disconnection instruction is issued on the mobile terminal 100 but also when the VNC disconnection is received on the MFP 110, the MFP 110 may automatically perform the logout processing, or may not perform the logout processing because the reception of the VNC disconnection on the MFP 110 means that the user is present in front of the MFP 110.

The first exemplary embodiment has been described as the example in which the logout processing is automatically performed when the operation for disconnecting the VNC connection is received on the mobile terminal 100. However, even when the operation for disconnecting the VNC connection is not received, the VNC connection may be disconnected at a timing not intended by the user. Thus, a second exemplary embodiment will be described as an example in which the logout processing is performed when the VNC connection is disconnected at the timing not intended by the user. The timing not intended by the user refers to, for example, when the VNC connection is disconnected due to a communication failure, or when the VNC connection is disconnected because the mobile terminal 100 is powered off during the VNC connection.

In this case, the MFP 110, which is the VNC server, detects that the VNC connection is disconnected, and automatically performs the logout processing based on the detection. This exemplary embodiment allows the MFP 110 to automatically perform the logout processing even when the VNC connection is disconnected between the mobile terminal 100 and the MFP 110 at the timing not intended by the user, thereby eliminating the risk that the MFP 110 in the login state is used by another person.

The above-described exemplary embodiments are configured in such a manner that the MFP 110 automatically performs the logout processing when receiving an event for stopping the remote operation on the mobile terminal 100 (for example, the pressing of the end button 878 and the shutdown of the MFP application 300). However, the exemplary embodiments may be configured in such a manner that the MFP 110 automatically performs autoclear processing when receiving the event for stopping the remote operation. The autoclear processing refers to processing for returning the displayed screen to the screen set as the initial screen.

Further, the above-described exemplary embodiments have been described citing the example in which the screen similar to the screen displayed on the MFP 110 is displayed on the mobile terminal 100 in the VNC connection, but the exemplary embodiments are not limited thereto. For example, the above-described exemplary embodiments can also be applied in the case of, for example, displaying a screen extended from the screen of the MFP 110 on the mobile terminal 100 instead of displaying the screen similar to the screen of the MFP 110.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-183169, filed Oct. 30, 2020, which is hereby incorporated by reference herein in its entirety.

What is claimed is:

1. A method for controlling an information processing apparatus configured to communicate with an image processing apparatus configured to perform login processing, the method comprising:
- displaying, on a display of the information processing apparatus, a screen to be displayed on the image processing apparatus by establishing a virtual network computing (VNC) connection with the image processing apparatus;
- displaying a button for receiving an instruction to stop the VNC connection with the image processing apparatus; and
- transmitting, to the image processing apparatus, information that stops the VNC connection and information that causes the image processing apparatus to perform logout processing of logging out a user currently logging into the image processing apparatus, based on the button having been selected by a user,
- wherein, in a case where the user selects the button, the image processing apparatus performs the logout processing automatically and then performs processing of stopping the VNC connection.

2. The method according to claim 1, wherein an application for displaying the screen runs on the information processing apparatus.

3. The method according to claim 2, wherein the application is an application for issuing a print instruction or a scan instruction to the image processing apparatus.

4. An information processing apparatus configured to communicate with an image processing apparatus configured to perform login processing, the information processing apparatus comprising:
- one or more processors; and
- at least one memory storing executable instructions, which when executed by the one or more processors, cause the information processing apparatus to:
  - display, on a display of the information processing apparatus, a screen to be displayed on the image processing apparatus by establishing a virtual network computing (VNC) connection with the image processing apparatus;
  - display a button for receiving an instruction to stop the VNC connection with the image processing apparatus; and
  - transmit, to the image processing apparatus, information that stops the VNC connection and information that causes the image processing apparatus to perform logout processing of logging out a user currently logging into the image processing apparatus, based on the button having been selected by a user,
  - wherein, in a case where the user selects the button, the image processing apparatus performs the logout processing automatically and then performs processing of stopping the VNC connection.

5. A non-transitory computer-readable storage medium storing a program to cause a computer to perform a method for controlling an information processing apparatus configured to communicate with an image processing apparatus configured to perform login processing, the method comprising:
- displaying, on a display of the information processing apparatus, a screen to be displayed on the image processing apparatus by establishing a virtual network computing (VNC) connection with the image processing apparatus;
- displaying a button for receiving an instruction to stop the VNC connection with the image processing apparatus; and
- transmitting, to the image processing apparatus, information that stops the VNC connection and information that causes the image processing apparatus to perform logout processing of logging out a user currently logging into the image processing apparatus, based on the button having been selected by a user,
- wherein, in a case where the user selects the button, the image processing apparatus performs the logout processing automatically and then performs processing of stopping the VNC connection.

6. The method according to claim 1, further comprising further displaying, on a same screen as the screen displaying the button for receiving the instruction to stop the VNC connection, a button for instructing the image processing apparatus to perform the logout processing.

7. The method according to claim 6, wherein position information for the button for instructing the image processing apparatus to perform the logout processing is transmitted to the image processing apparatus based on the button having been selected by the user.

8. The method according to claim 1, wherein a login instruction is received on the screen displayed on the display by establishing the VNC connection with the image processing apparatus.

* * * * *